United States Patent
Cantwell et al.

(10) Patent No.: US 6,553,237 B1
(45) Date of Patent: Apr. 22, 2003

(54) METHOD AND APPARATUS FOR REMOTE UNIT PASSIVATION

(75) Inventors: Stephanie H. Cantwell, Redmond, WA (US); David J. Nix, Austin, TX (US); David A. Rostowsky, Bellevue, WA (US); Adrian M. Yip, Bothell, WA (US)

(73) Assignee: AT&T Wireless Services, Inc., Redmond, WA (US)

( * ) Notice: Subject to any disclaimer, the term of this patent is extended or adjusted under 35 U.S.C. 154(b) by 0 days.

(21) Appl. No.: 09/204,046

(22) Filed: Dec. 2, 1998

(51) Int. Cl.[7] .................................... H04B 7/005
(52) U.S. Cl. ..................... 455/516; 455/510; 455/528
(58) Field of Search ................... 455/461, 462, 455/463, 464, 450, 510, 560–564, 550, 517, 516, 509, 528, 574, 62; 370/448

(56) References Cited

U.S. PATENT DOCUMENTS

| 4,628,311 A | * | 12/1986 | Milling |
| 4,771,448 A | * | 9/1988 | Koohgoli et al. |
| 5,278,891 A | * | 1/1994 | Bhagat et al. |
| 5,390,360 A | * | 2/1995 | Scop et al. |
| 5,493,569 A | * | 2/1996 | Buchholz et al. |
| 5,682,604 A | * | 10/1997 | Kashi et al. |
| 5,799,254 A | * | 8/1998 | Karmi et al. ............... 455/528 |
| 5,933,786 A | * | 8/1999 | Sarpola et al. |
| 6,014,705 A | * | 1/2000 | Koenck et al. |
| 6,075,779 A | * | 6/2000 | Agarwal et al. ............ 370/337 |

* cited by examiner

Primary Examiner—Curtis Kuntz
Assistant Examiner—Barry W Taylor
(74) Attorney, Agent, or Firm—Kenyon & Kenyon

(57) ABSTRACT

A method and an apparatus provide for controlling a remote unit's requests to access network resources in a wireless communication network. The method and apparatus scale back the frequency with which the remote unit attempts to establish a connection with a base unit, which connection would provide dial tone to a communication device associated with a remote unit. In accordance with the method, with each unsuccessful attempt to establish a connection with the base unit a retry timing interval is extended, thereby throttling back the number of establishment attempts by the remote unit.

7 Claims, 4 Drawing Sheets

METHOD AND APPARATUS FOR REMOTE UNIT PASSIVATION

BACKGROUND OF THE INVENTION

The present invention is directed to a method and apparatus for controlling requests for accessing resources in a wireless network. More specifically, the present invention is directed to a method and apparatus for making a remote unit more passive in its attempts to establish a connection to a base unit or base station in the wireless network.

It has long been known that there are many advantages to be derived from providing communication networks whereby communication terminals can communicate without the necessity of a wireline connection. One example of a wireless communication system is a mobile communications network in which mobile devices communicate via air links with base stations. The base stations are connected to mobile switching centers which control routing of communications into, typically, a wireline network.

Another wireless communication network configuration has been proposed. More specifically, it has been proposed to provide a service referred to as "fixed wireless communication". This configuration is meant to be either an adjunct to or substitute for local wireline communication to fixed locations. For example, as an alternative to local exchange carrier service via wireline local loops, it has been proposed to provide a fixed location with a wireless communication device referred to as a remote unit. The remote unit has transmission and receive capabilities for communicating with the base station via the available air links. It also can interface with a telephone or other communication device that is within or at the fixed location.

An example of this second system is illustrated in FIG. 1 of the present application. In this arrangement there are a plurality of remote units 101 to 104, each coupled to a communication device such as a telephone 105 to 108. The remote units communicate via air links to a base unit 110 that is coupled to a local wireline switch 111, for example, a No. 5 ESS supplied by Lucent Technologies.

In this fixed wireless communication system, it is desirable to approximate as closely as possible the service standards provided by wireline communications. As an example, in a wireline situation when a communication device such as a telephone goes off hook, there is a protocol for furnishing dial tone to the telephone device. The user of the communication device has a high expectation that dial tone will be supplied immediately upon taking the communication device off hook. It is desirable then in the fixed wireless context to provide comparable service to the end user. In this circumstance then, it is desirable that as soon as possible after the communication device goes off-hook the remote unit establish a connection to the base unit whereby dial tone can be provided to the telephone.

A problem may arise, however, where a plurality of remote units attempt to establish connections to the base unit at one time. In one example environment, there may be 2000 remote units assigned to a single base station. The base station cannot handle 2000 access requests at the same time. In fact, given the limitations on bandwidth for the airlinks between the remote unit and the base station, only ten or so calls can be handled at any given time. To reduce the burden on this shared bandwidth, the fixed wireless system can provide common access channels for call set up. These common access channels have a small amount of bandwidth for call setup and that small amount of bandwidth is shared by all of the remote units. It is possible in this configuration that various remote units will attempt to establish connections to the base unit at or about the same time thereby creating collisions in the shared bandwidth. This can put a heavy burden on the communication system and can reduce the likelihood that customers or end users will receive the type of service that they have come to expect from wireline communications. It would be beneficial if a technique was available for controlling requests for accessing resources in such a network.

SUMMARY OF THE INVENTION

The present invention provides a method and apparatus for controlling requests to access resources in a wireless network. A remote unit will first attempt to establish a connection with the base unit when a communication device associated with the remote unit goes off hook. If the base unit responds to this establishment attempt with an indication that the attempt has not been successful, then the remote unit waits a first predetermined amount of time before conducting a second establishment attempt. If this second establishment attempt is also unsuccessful, then the remote unit activates a timer for a second time interval longer than the first time interval. When the second time interval expires, another establishment attempt is made. If additional establishment attempts are unsuccessful, the time interval for further attempts can be expanded, thereby throttling back the remote unit's establishment attempts. This reduces the load on the base unit and thereby reduces the likelihood of a complete system failure or freeze up in which the base unit could ultimately serve no one of the remote units because of the high likelihood of collision between the remote units. Thus, this invention provides that more of the remote units will receive service comparable to wireline service in terms of rapidly providing a dial tone when the communication device associated with the remote unit goes off hook.

In one embodiment of the invention, the timing intervals are set in accordance with a specification provided for wireline services, referred to as the TR303 specification. In accordance with those requirements, the first two time intervals are prescribed by the specification. Additional time intervals can be supplied and extended in accordance with a more detailed algorithm, such as one of the algorithms described in the detailed description set forth below.

DETAILED DESCRIPTION

Figure 1:
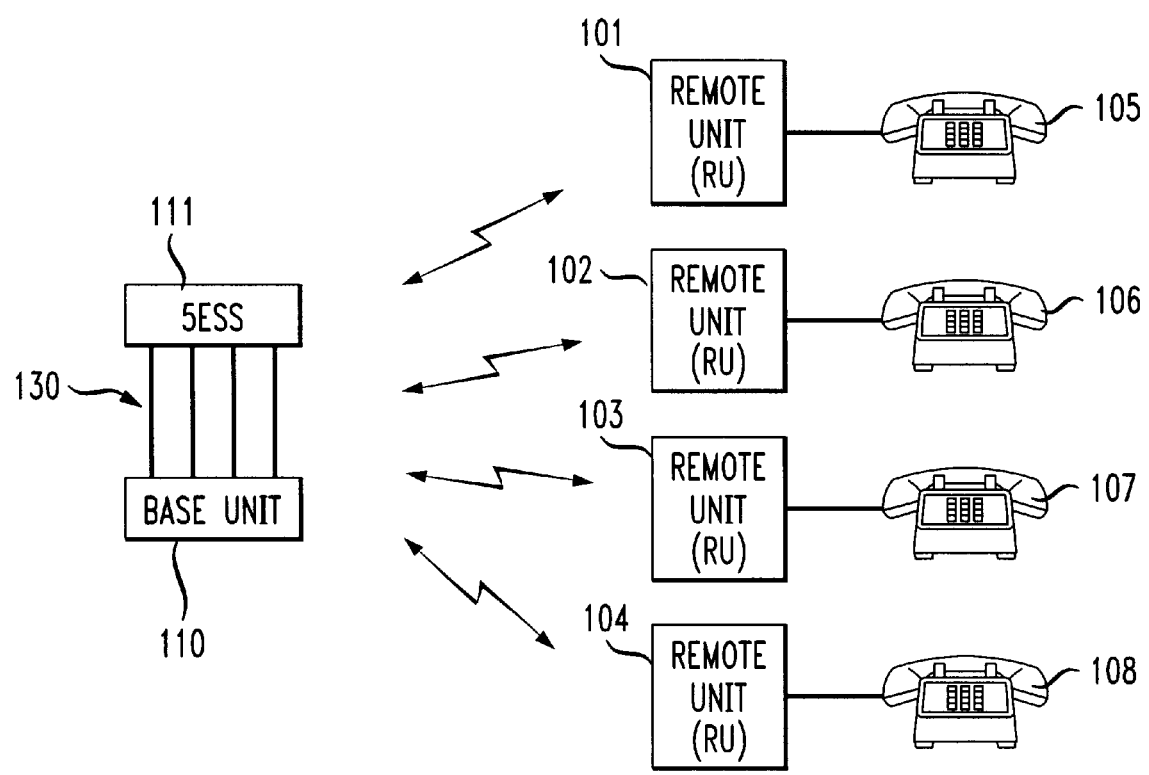
FIG. 1 illustrates a system in which the method and apparatus of the present invention may be employed.

The present invention provides a method and apparatus for throttling back a remote unit when it unsuccessfully attempts to establish a connection with a base station. When a remote unit sends an establishment attempt over an air link to the base station after the communication device associated with the remote unit goes off hook, it is requesting that the base station supply dial tone over the air to the remote unit and hence the communication device. The remote unit may detect that this establishment attempt has failed. For instance, it is possible that the base station will reply to such an establishment attempt with a message referred to as Release-Complete. This message indicates that the base station cannot accept the establishment attempt at that time. Alternatively, there might be a failure of the network interface, shown as element 130 in FIG. 1, that connects the base station to the local switch. Such a failure would prevent the base station from responding to the establishment attempt. The remote unit could detect a lack of response over some time-out interval as indicating that the establishment attempt has been unsuccessful. Regardless of how the remote unit determines that the establishment attempt has not succeeded, the present invention provides a capability for adjusting the frequency with which the remote unit will retry establishment attempts. In accordance with an embodiment of the invention, the time for retry is incremented so that as more and more establishment attempts fail the remote unit tries less and less frequently to contact the base unit. This throttling back of establishment attempts is meant to reduce the collisions between the particular remote unit and the other remote units associated with a base station. While it might be possible to just shut down the remote unit after a prescribed number of failed establishment attempts, this would run contrary to a wireline communications specification referred to as TR303 which covers local loop service. Since it is desirable for these fixed wireless configurations to emulate as closely as possible local loop service, it is more appropriate for the remote unit to continue to attempt to establish connection with the base unit so as to try to obtain dial tone on behalf of the customer who is seeking wireline-like service.

Figure 2:
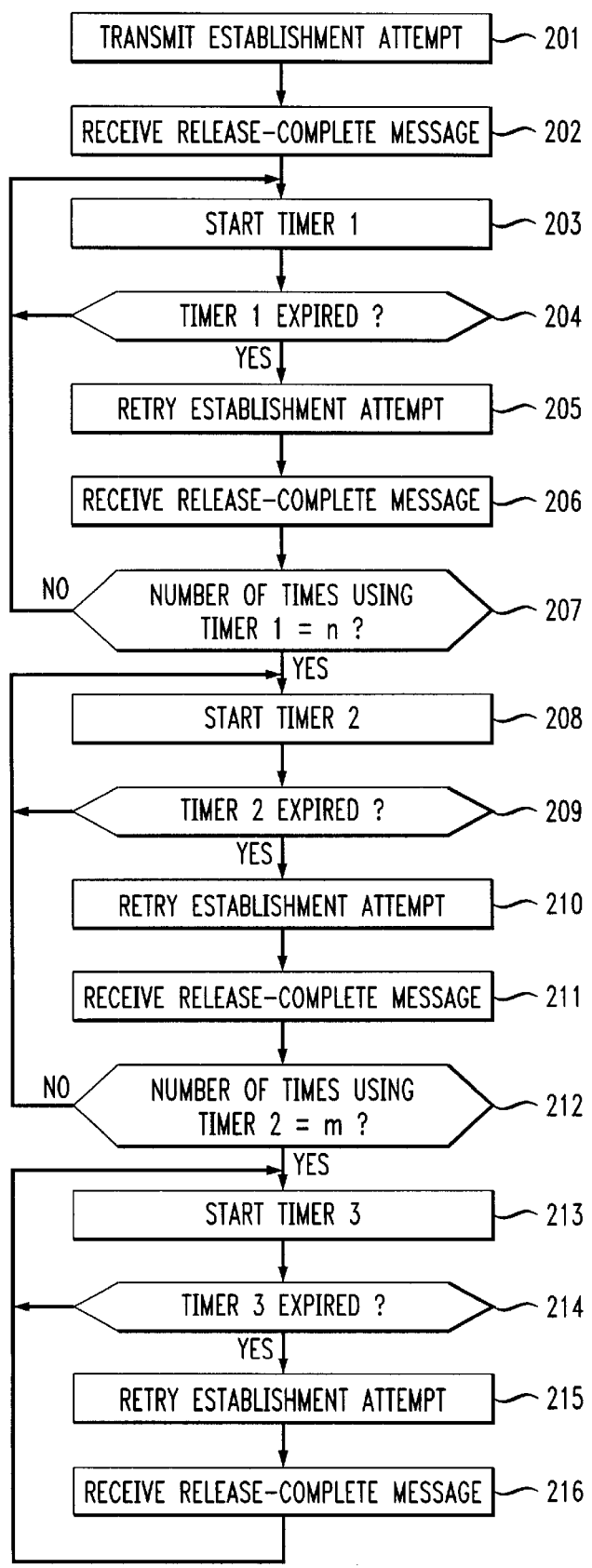
FIG. 2 illustrates a flow chart useful for explaining a first embodiment of a method in accordance with the present invention.

A flow chart of a method for performing an embodiment of the present invention is illustrated in FIG. 2. The method begins with the remote unit transmitting an establishment attempt, 201. This can occur, for instance when the remote unit is advised that the communication equipment connected thereto has gone off-hook and thereby seeks a dial tone. If the remote unit receives a Release-Complete message, step 202 then it starts a first timer (timer 1), step 203. The Release-Complete message is an indication that the establishment attempt has not succeeded. As described above the remote unit could be able to detect a failure of an establishment attempt by some other means, such as by running some other timer and determining that if no response has been received at the expiration of that timer then the establishment attempt must have failed. The precise technique for determining establishment attempt failure is not critical to the implementation of the present invention. When timer 1 has expired as detected in step 204, the establishment attempt is retried, step 205. Timer 1 may be set to a first value which is relatively short it is the goal to provide dial tone to the end user as quickly as possible and it is hoped that the failure of the establishment attempt would not be repeated. If the remote unit again detects failure of an establishment attempt, such as by receiving a Release-Complete message in step 206 then the remote unit detects the number of times that timer 1 has been used for setting a time interval for retrying establishment attempts. If the number of retries using timer 1 is equal to some predetermined number referred to as "n" in step 207, then the remote unit starts a second timer, timer 2, which has a time out interval that is greater than timer 1, see step 208. If timer 1 has not been used the predetermined number of times then the remote unit starts timer 1 again and loops through steps 203, 204, 205, 206 and 207 until such time as either the establishment attempt is successful or timer 1 has been used the predetermined number of times. In one embodiment timer 1, the shortest interval timer, is used only once although it is possible to program the remote unit so as to have timer 1 used more than one time.

If timer 2 is utilized then once it is detected that timer 2 has expired, in step 209, the remote unit again attempts to establish communication with the base station, step 210. As indicated above, the time out interval for the timer 2 is greater than that for timer 1. If the remote unit determines that the establishment attempt has not succeeded, such as by receiving a Release-Complete message as in step 211, then step 212, which is analogous to step 207, determines whether timer 2 has been used some predetermined number of times designated as "m". This assures that the remote unit can use timer 2 one or more times as the time interval for awaiting retries of establishment attempts. If in fact the timer 2 has been utilized "m" times, then the remote unit starts timer 3 in step 213 and goes through analogous steps 214, 215, and 216 in further attempts at establishing a connection with the base unit.

By using these multiple timers, the present invention allows the remote unit to be controlled so as to throttle back its requests to the base station. This reduces the likelihood of collisions with other remote units that are attempting to establish connection to the same base station. This is an improvement over repeatedly attempting to request a connection with a fixed, short time interval between attempts.

Figure 4:
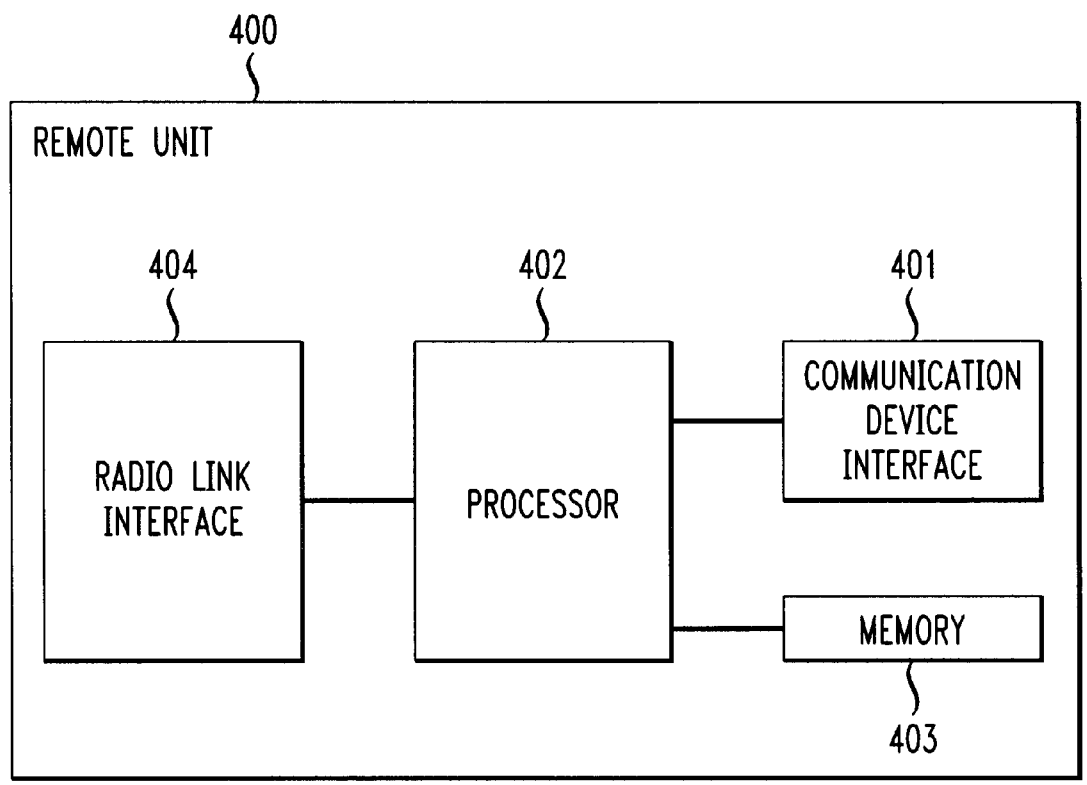
FIG. 4 illustrates a block of diagram of a remote unit, in accordance with the present invention.

FIG. 4 illustrates in block diagram form part of the contents of the remote unit 400, which might be utilized in connection with the present invention. The remote unit can include a communication device interface 401 which is adapted to receive communications from a communication device such as a telephone, fax or modem. A processor and memory, 402 and 403, control the operation of the remote unit including the signal processing necessary to translate the communications received from the communication device into signals appropriate for wireless communication. Furthermore, the processor and memory together operate software controls which, among other things implement the retry techniques of the present invention. The processor and memory combination may be employed to implement for example the various timers referred to in the description above. Alternatively, it might be possible to provide some other hardware timers for implementing these methods as well. Any technique by which time out intervals might be detected and varied during the course of a plurality of attempts at establishing connection with the base station might be employable in connection with the remote unit. The radio link interface 404 provides the transmit and receive capabilities which enable the remote unit to communicate with the base station over the allocated bandwidth for the these wireless communications.

Figure 3:
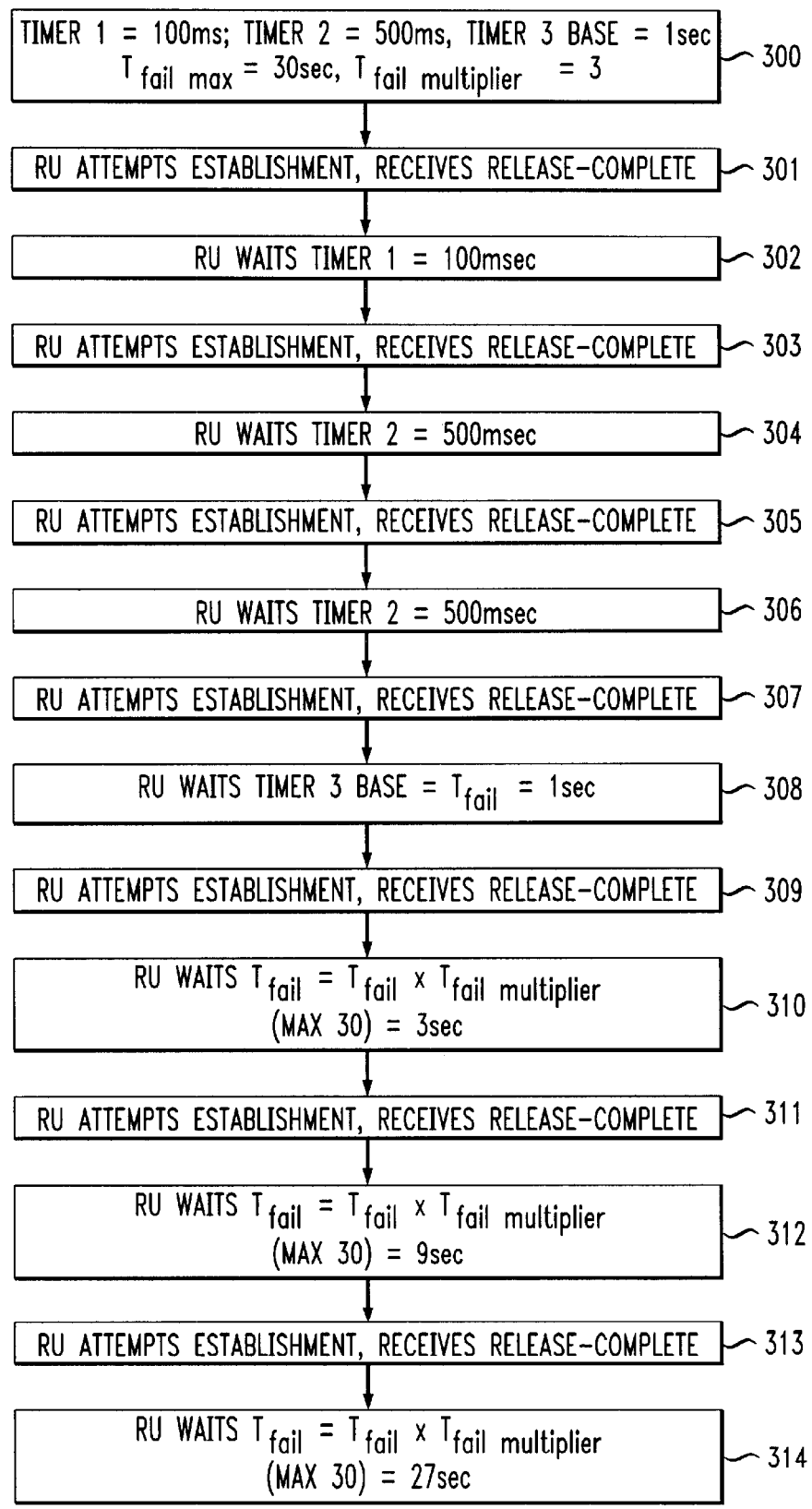
FIG. 3 illustrates a second flow chart helpful for explaining a second embodiment of the present invention.

An alternative method for providing the control of requests for access to network resources is illustrated in FIG. 3.

In step 300, the operational parameters for implementing the retry control are set. For example, timer 1 can be set to 100 milliseconds; timer 2 can be set to 500 milliseconds and a base value for timer 3 can be set to 1 second. Additional parameters referred to as $T_{fail\ max}$ is set equal to 30 seconds. This value is the maximum amount of delay between detection of a failure of an establishment attempt and a retry of an establishment attempt. It is the outer boundary for a time interval for establishing when retries should be made. Another parameter provided is a $T_{fail\ multiplier}$. This allows the timer 3 value to be increased at a particular rate over time up to the maximum value of $T_{fail\ max}$. In this instance the $T_{fail\ multiplier}$ is selected to be 3. It should be recognized that these values may be selected with various parameters in mind. In particular the first two values may be selected in accordance with the requirements set forth in the wireloop specifications referred to above (TR303) and the values are referred to in that specification are typically referred to as the T303 and T396 values. The timer 3 values are more arbitrary and more system specific. Furthermore, the $T_{fail\ max}$ and the $T_{fail\ multiplier}$ values are selected mindful of the goals of limiting the delay as well throttling the remote unit. These parameters can be selected for optimal values based on the system design. The particular values set forth in the example in FIG. 3 are meant only for illustrative purposes and not to be limiting. In step 301 the remote unit attempts establishment and receives a Release-Complete signal. Again, this signal is but one way in which the remote unit determines that the establishment has failed. Other techniques might be employed. In step 302 the remote unit waits for the time out interval of timer 1, here 100 milliseconds, and then in step 303 it attempts establishment again. As it detects a failure to establish the remote unit waits for the timer interval of time 2, here 500 milliseconds, (step 304) and then in step 305 again attempts establishment. In this embodiment, as it receives another indication of failure to establish connection, the remote unit waits the timer 2 interval once more, that is it waits for 500 milliseconds before attempting establishment again in step 307. As it receives yet another indication that establishment has failed the remote unit then waits the interval associated with the base timer 3 value which is set equal to an initial $T_{fail}$ value, here one second (step 308). When that interval expires the remote unit attempts establishment again and may receive a Release-Complete message, step 309. The remote unit then waits for a modified timer 3 value that corresponds to the initial $T_{fail}$ value times the $T_{fail\ multiplier}$ and this new value is assigned to $T_{fail}$. If the calculated value does not exceed the maximum of thirty seconds, then the new value is employed as the time out interval. Here in the first run through of this algorithm the remote unit waits for three seconds in step 310 then reattempts establishment in step 311. In step 312 the remote unit again waits for $T_{fail}$ which is now the previously calculated $T_{fail}$ times the $T_{fail\ multiplier}$ not to exceed the maximum $T_{fail\ max}$ or thirty seconds. Here the calculation results in a nine second delay before attempting establishment again in step 313. Step 314 indicates that again the remote unit waits but this time even longer as modified by the $T_{fail\ multiplier}$. In fact, in this implementation in step 314 the remote unit would wait 27 seconds before trying to establish connection with the base unit again. If it was necessary to continue the process, since the next multiplication would result in a number larger than $T_{fail\ max}$, the remote unit would then simply use the 30 second value for each subsequent interval for determining when to retry the establishment attempt.

It should be noted that if, at any time during the course of the implementation of this technique, the remote unit detects that the communication device goes back on hook, that is the user hangs up the communication device, the remote unit goes back to its initial state. That is, the next time the remote unit detects an off-hook condition, it begins again with timer 1 and then timer 2. This is also true with regard to the technique as it was described above in connection with FIG. 2.

It should also be noted that the number of times that the remote unit employs a given interval for determining how long to wait before retrying could be varied from that shown in FIG. 3. For example, the first timer interval might be utilized for more than one retry attempt. The second timer interval, timer 2, could be used for one interval or more than two intervals. Furthermore, any one of the $T_{fail}$ values used for example in steps 308, 310, 312 or 314 could be used multiple times before further increasing the value. These are all system design choices that the network provider can make to optimize the control of these requests for network resources.

In accordance with the present invention, the remote unit automatically scales back its attempts to establish a connection with a base station while at the same time satisfying wireline type service expectations of end users.

What is claimed is:

1. A method for controlling requests from a wireless communications device to access a wireless network, the method comprising:

periodically transmitting an access request to a base station wherein the period between transmissions is determined in accordance with a first time interval;

after n transmissions of the access request, periodically transmitting an access request to the base station wherein the period between transmissions is determined in accordance with a second time interval;

after m transmissions of access requests, where m>n, systematically increasing a time interval between transmissions of access requests until either a response is received, or the period reaches a maximum value.

2. The method of claim 1, wherein said access request comprises an establishment attempt.

3. The method of claim 2, wherein said first and second time intervals correspond to re-try times associated with wireline services.

4. The method of claim 1, wherein if after n or more transmissions of access requests the wireless communication device goes on-hook the period for retransmissions in a subsequent access attempt is re-set to the first time interval.

5. The method of claim 1, wherein said of systematically increasing the time interval includes:

retrieving a first reference time;

after a subsequent transmission, increasing the time interval using said first reference time and a predetermined factor; and after each subsequent transmission, increasing the time interval using said predetermined factor and the immediately preceding time interval.

6. In a wireless communication system, a method for emulating requests for dial tone in wireline networks, the method comprising:

detecting that a wireless communication device goes off-hook;

transmitting an establishment attempt to a base unit;

determining whether said establishment attempt is successful during a first time interval and if it is not then transmitting another establishment attempt to the base unit;

determining whether said another establishment attempt is successful during a second time interval greater than said first time interval;

if said another establishment attempt is not successful, transmitting yet another establishment attempt to the base unit;

determining whether said yet another establishment attempt is successful during a third time interval greater than said second time interval; and if said yet another establishment attempt is unsuccessful, periodically transmitting an establishment attempt to the base unit wherein a period of time between successive attempts is systematically increased until either establishment is successful or the period reaches a maximum value.

7. A method for conserving bandwidth in a fixed wireless environment that includes a plurality of remote wireless communication devices and a base unit, the method comprising:

detecting that a wireless communication device goes off-hook;

transmitting an establishment attempt to a base unit;

determining whether said establishment attempt is successful during a first time interval and if it is not then transmitting another establishment attempt to the base unit;

determining whether said another establishment attempt is successful during a second time interval greater than said first time interval;

if said another establishment attempt is not successful, transmitting yet another establishment to the base unit;

determining whether said yet another establishment attempt is successful during a third time interval equal to said second time interval; and if said yet another establishment attempt is unsuccessful periodically transmitting an establishment attempt to the base unit wherein a period of time between successive attempts is systematically increased until either establishment is successful or the period reaches a maximum value.

* * * * *